March 18, 1930. C. R. REID 1,751,422
APPARATUS FOR REMOVING WATER BORNE MATERIAL
FROM RACEWAYS AND THE LIKE
Original Filed Sept. 10, 1928  2 Sheets-Sheet 1

Inventor
Charles R. Reid
By
Attorney

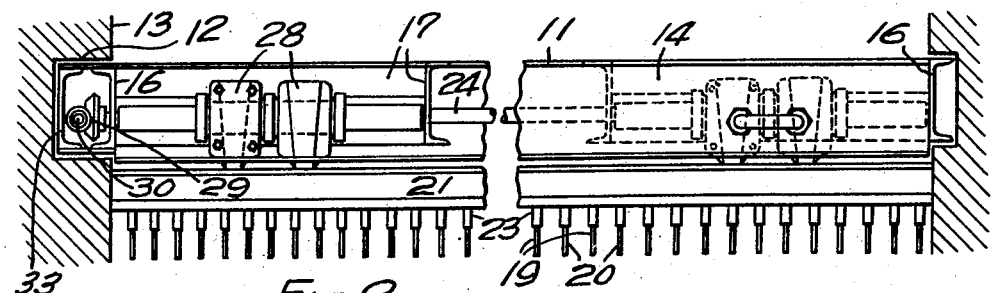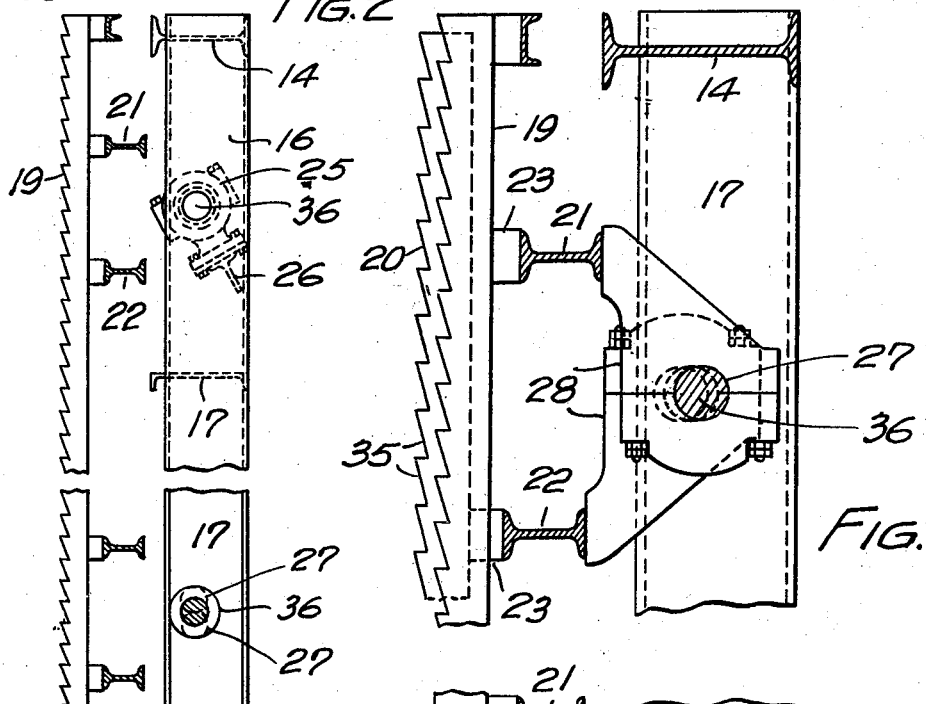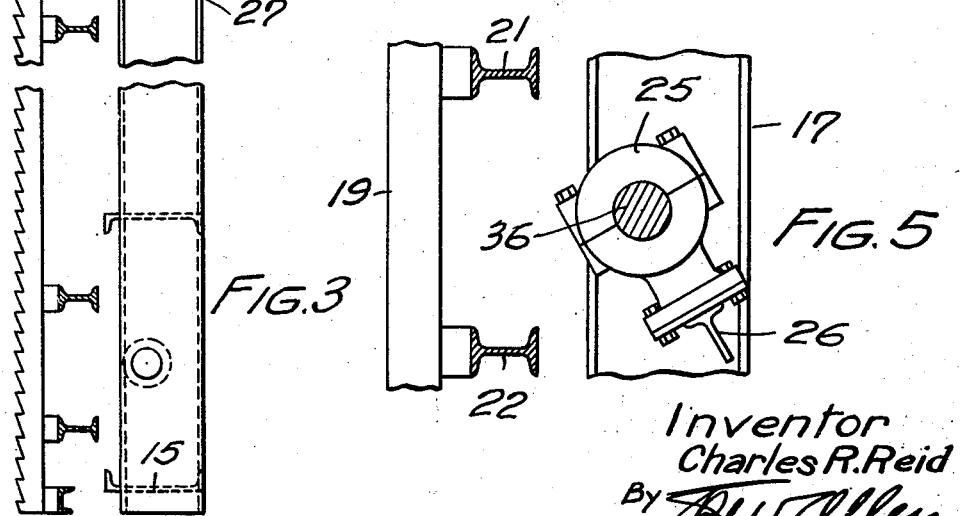

Patented Mar. 18, 1930

1,751,422

UNITED STATES PATENT OFFICE

CHARLES R. REID, OF SHAWINIGAN FALLS, QUEBEC, CANADA

APPARATUS FOR REMOVING WATER-BORNE MATERIAL FROM RACEWAYS AND THE LIKE

Original application filed September 10, 1928, Serial No. 304,965, and in Canada September 26, 1928. Divided and this application filed January 9, 1929. Serial No. 331,164.

This application is a division from my former application Serial Number 304,965, filed the 10th day of September 1928, and the invention herein dealt with relates, as in the former application, to improvements in racks for removing water borne material, such as branches of trees, weeds, etc., whether floating or submerged, from water courses such as the intakes of turbines, pumps and the like, and the object is to provide a device of this class which will not only separate the rubbish from the water flowing through but which will be self-clearing to avoid obstruction to water flow and damage to itself through water pressure upon collected rubbish.

A further object is to provide a rack which will not become choked with frazil.

A still further object is to provide a rack which will raise all collected submerged rubbish to the surface of the water so that it may be removed.

Another object is to provide a device of this character which may be made in comparatively small, self contained and easily handled sections, in order to facilitate insertion in and removal from deep channels.

Various other objects and the advantages of the invention may be ascertained from the following description and the accompanying drawings.

The invention resides briefly in the provision of a rack having a frame composed of as many sections as desirable, each carrying a series of parallel bars relatively movable in their longitudinal directions with a circular movement, and means in each section for effecting the relative movement of the bars. The bars are arranged in two or more series connected to a common operating means.

In the accompanying drawings which illustrate one embodiment of the invention but to the details of which the invention is not confined, as numerous modifications of detail and substitutions of equivalents may be effected without departing from the spirit of the invention;—

Fig. 2 is a plan view of a rack section.

Fig. 3 is a vertical sectional view of a rack section at the line 3—3 of Figure 1.

Fig. 4 is a fragmentary vertical sectional view similar to Figure 3 but on an enlarged scale showing the arrangement of connecting rods to operate the sets of bars.

Fig. 5 is a view similar to Figure 4 with the connecting rods removed to disclose the shaft bearings.

Figure 1:
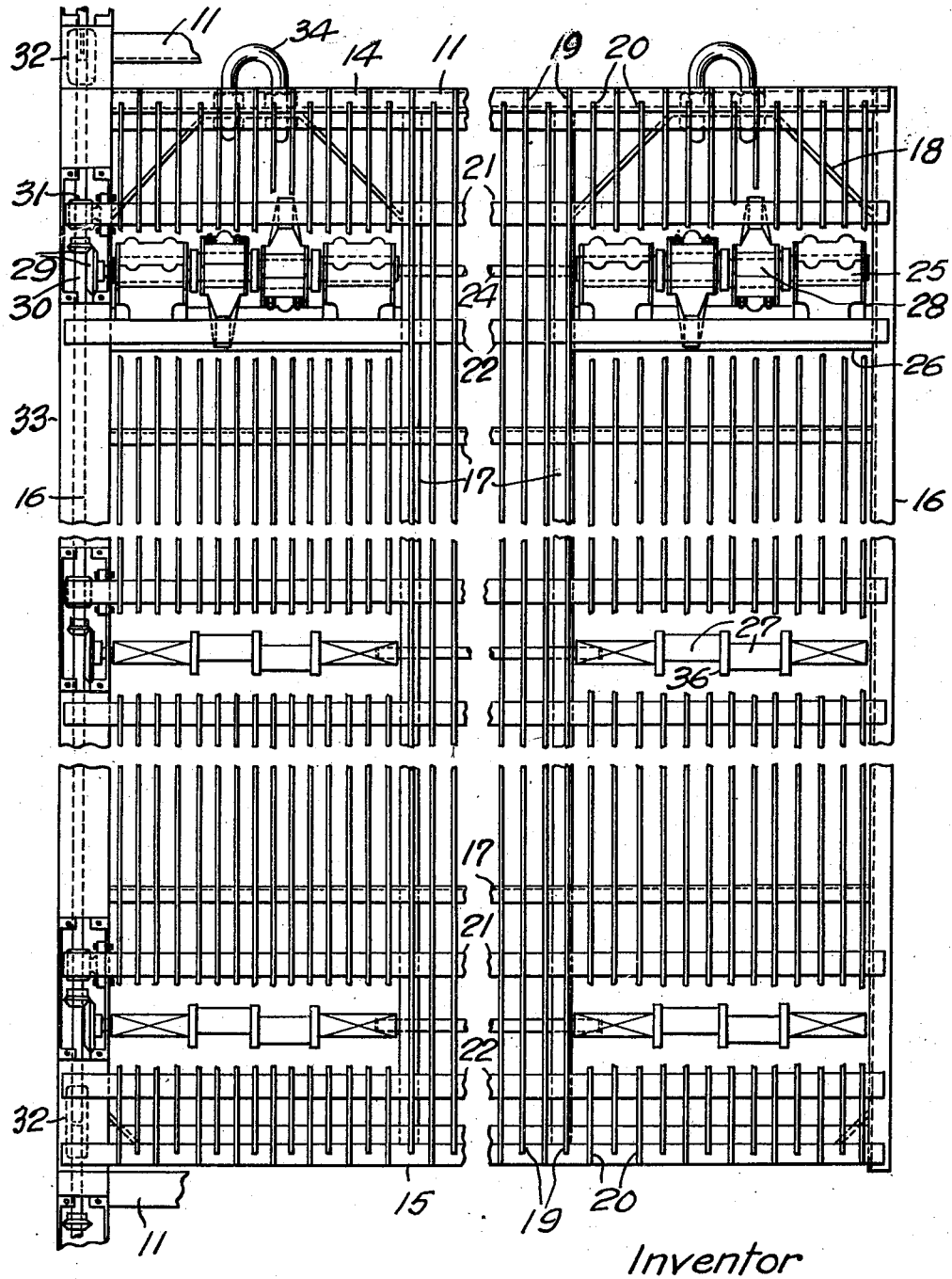
Fig. 1 is a front elevation of one section of a rack constructed according to this invention together with fragments of the racks which may be located above and below it.

Referring more particularly to the drawings, 11 designates a plurality of rack sections adapted to be located one above the other on edge in guiding grooves or channels 12 formed in walls or piers 13 in a water course, such as the head race leading to a wheel house. Each of the frame sections comprises top and bottom members 14 and 15 respectively, side members 16 and as many transverse and vertical intermediate members 17 as are desired, together with the usual or necessary diagonal bracing 18. These members are secured together in any suitable way to form a rigid rectangular frame. A plurality of series of vertical bars, for example, two series of bars 19 and 20, are provided, the bars of the two series being alternated. The bars 19 and 20 are rigidly connected at the top, bottom and one or more intermediate points to transverse carriers 21 and 22 respectively, which are entirely separate from the rack frame, fillers 23 being provided between the bars and carriers so that the carriers may be located a sufficient distance from the bars to permit movement in the manner hereinafter described. The carriers of one section, for instance the carriers 21, are a short distance above the carriers 22 of the other section. The bars of each series are rectangular in cross section and are disposed edgewise to the flow of water through them as is customary, so as to offer the least possible obstruction to water flow and to have the greatest possible strength in resisting pressure on them due to accumulation of rubbish. Preferably, each set of bars is of sufficient strength to withstand the full pressure of water in the event of rubbish accumulating against the bars to such an extent as to substantially prevent flow of water past the rack.

Transverse shafts 24 are provided at the top and bottom of the frame and, if desired, at one or more intermediate levels in the height of the frame. These shafts are mounted in bearings 25 secured to horizontal supports 26 extending between the vertical frame members 16 and 17. These bearings are disposed at the ends of the shafts and at as many points in the length of the shaft as may be desirable. The spacing of the shafts 24 and of the bar carriers 21 and 22 is preferably such that each shaft is vertically equidistant between the adjacent carriers 21 and 22 immediately behind or on the downstream side of the vertical plane containing the carriers. The shafts are provided adjacent their ends and at as many intermediate points as may be desired with eccentric portions or cranks 27 arranged in pairs with the cranks of each pair oppositely pitched. A series of connecting rods 28 are rigidly connected to the carriers 21 and 22, and operatively engage the eccentrics or cranks 27. One end of each of the shafts 24 is connected by bevel gears 29 with a vertical shaft 30 mounted in bearings 31 on the adjacent vertical frame member 16. The lower end of the shaft 30 in each section is provided with a coupling device 32, such as a sleeve projecting beyond the end of the shaft, and the upper end of each shaft 30 is adapted for operative engagement with the coupling of the corresponding shaft in the section above. These couplings are of such character that the shafts can be connected in only a single angular relation.

A housing 33 is provided on the vertical frame member 16, to which the shaft 30 is attached to protect the shaft and gearing. Lifting eyes 34 are preferably mounted in the top frame member 14 of each rack section.

The upstream edges of the bars may be ratchet-toothed, as shown in Figures 3 and 4, the teeth 35 having upper substantially horizontal flanks and lower inclined flanks, so that the teeth may be said to face upwardly. Alternatively, the upstream edges of the bars may be plain, as shown in Figure 5.

There is illustrated in Figure 1 one very convenient and inexpensive method of forming the cranks and bearings. This method consists in forming the cranks and adjacent journals in a single casting or forging, designated 36, which is mounted on the shaft 24. When this construction is resorted to, the shafts may be continuous across the rack section, or may be in a number of separate lengths connected to the ends of the castings 36 as shown in Figure 1.

The operation of the device is as follows:—

If the depth of water necessitates the use of two or more superposed rack sections, these are lowered one after the other in the guide grooves 12, so that the coupling 32 of each upper section meshes with the upper end of the shaft 30 in the section next below. The couplings may be set in proper meshing position before the sections are lowered but, even if this is not done, the coupling and shaft may be meshed by partial rotation of the shaft 30. When the rack sections are lowered into place, the upper end of the shaft 30 in the uppermost section is connected in any suitable way to a source of power, such as an electric motor, and the shaft 30 is continuously rotated and similarly rotates the corresponding shafts of the sections beneath. This rotation is transmitted through the gears 29 to the transverse shafts 24. Because of the rigid attachment of the connecting rods 28 to the carriers 21 and 22, of the movable rack bars, the both grids comprising the carriers 21 and bars 19 and carriers 22 and bars 20 are caused to move in small vertically disposed circular orbits. Because of the opposite pitching of the cranks, the bars alternately advance beyond or upstream from one another, then rise and retreat behind the upstream edges of the other bars and finally descend to the starting point. Water borne rubbish is held by the flow of water quite tightly against the rack. In its outward or upstream movement, each series of bars moves this rubbish upstream away from the other bars and, at the same time, lifts it to a slightly higher elevation, where it is caught by the other series of bars and similarly moved while the first series of bars descends and obtains a fresh grip on the rubbish at a lower point. This continuous operation lifts submerged rubbish to the surface of the stream where it may be readily removed by hand or by any suitable form of mechanical clearing device. While it is perhaps not necessary to provide teeth 35 on the upstream edges of the rack bars, these may be provided to minimize the possibility of rubbish slipping down, especially if the velocity of the water flow is not great. Obviously, the teeth, if any, may be of whatever size, shape or spacing is found most suitable to local conditions. As each rack lifts the rubbish away from the other rack, it is obvious that the full pressure due to head and velocity of the water and to the amount of obstruction in the channel must be sustained by the one rack only. It is for this reason that each rack must be of sufficient strength to withstand the maximum load which would be imposed if the flow of water should be completely blocked. The racks are well able to withstand such pressures without buckling or warping, by reason of the fact that each is supported and receives its motion at a plurality of points; in the simple form illustrated in Figure 1 at six points. When the shafts 30 of two or more superposed sections are coupled together, the corresponding racks of the sections move in unison, so that there is no interruption to the upward passage of rubbish. This movement in unison is necessary both to avoid the moving bars of one section interfering with those of another and to permit of very close spacing of the adjacent ends of the bars, so that there will be no appreciable horizontal space between the sections into which rubbish might enter. In this way, the rack itself is guarded against damage as well as the turbines or other devices which the rack is intended to protect.

Obviously, the number of moving racks in each section may be increased as desired and any desired number of moving racks may be combined with a stationary rack.

Having thus described my invention, what I claim is;—

1. A straining rack for water courses comprising a framework, a plurality of series of substantially vertical bars movable relatively to the framework, a plurality of series of transverse carriers to which the bars of the several series are respectively fixed, a plurality of crankshafts journalled in the framework each having a plurality of cranks for each series of bars and connecting rods rigidly fixed to each series of bars and operatively engaging the cranks of said crankshafts.

2. A straining rack for water courses, comprising a framework, a plurality of series of substantially vertical bars movable relatively to the framework, a plurality of series of transverse carriers to which the bars of the several series are respectively fixed, a plurality of crankshafts journalled in the framework each having a plurality of cranks for each series of bars and connecting rods rigidly fixed to each series of bars and operatively engaging the cranks of said crankshafts, and means for operating the crankshafts in unison.

3. A device according to claim 2, in which the means for operating the crankshafts comprises a vertical shaft journalled on the framework and gear connection between the vertical shaft and the crankshafts.

4. A straining rack for water courses comprising a rigid frame including upright side members, top, bottom and intermediate rails connected between the side members, a plurality of series of bars, the bars of each series being relatively movable to those of other series, transverse carriers for the bars, top, bottom and intermediate crankshafts journalled in the frame, connecting rods operatively related to the cranks of said crankshafts and rigidly connected to the transverse bar carriers, and means for moving said crankshafts in unison comprising a vertical shaft journalled on one side frame member, a gear connection between said vertical shaft and the top, bottom and intermediate shafts, and a housing for said vertical shaft and gear connections.

5. A straining rack for water courses, comprising a plurality of sections adapted to be superposed in edge to edge relation, each of said sections comprising a framework and a plurality of series of bars movable relatively to one another and to the framework, means for operating the bars of the several sections and means to couple the operating means of the sections together whereby corresponding bars thereof will operate in unison.

6. A straining rack for water courses, comprising a framework, two series of substantially vertical bars movable relatively to one another and to the framework, upper and lower transverse carriers for the bars, the carriers of two series being located at different levels, upper and lower crank shafts journalled on the framework vertically spaced midway between the carriers of the two series, and connections between the crankshafts and carriers to move the bars in orbits occupying parallel vertical planes.

7. A device according to claim 6, in which fillers are inserted between the carriers and the bars they carry.

8. A device according to claim 6, in which the carriers are located at and spaced from the downstream sides of the bars they carry sufficiently to avoid contact with the other bars during the oribital movement thereof.

9. A straining rack for water courses comprising a framework, a plurality of series of substantially vertical bars movable relatively to the framework, a plurality of transverse carriers for each series of bars, to which the bars of the several series are respectively fixed, corresponding carriers being located at different levels, a plurality of crankshafts journalled in the framework and each common to corresponding carriers and located at levels intermediate the levels of the upper and lower corresponding carriers, and connecting rods rigidly fixed to the carriers and operatively engaging the crankshafts common thereto.

10. A straining rack for water courses comprising a framework, a plurality of series of substantially vertical bars movable relatively to the framework, a plurality of transverse carriers for each series of bars, to which the bars of the several series are respectively fixed, corresponding carriers being located at different levels, a plurality of crankshafts journalled in the framework and each common to corresponding carriers and located at levels intermediate the levels of the upper and lower corresponding carriers, and connecting rods rigidly fixed to the carriers and operatively engaging the crankshafts common thereto, and means for operating the crankshafts in unison.

In witness whereof, I have hereunto set my hand.

CHARLES R. REID.